United States Patent
Berggren et al.

(10) Patent No.: US 9,712,291 B2
(45) Date of Patent: Jul. 18, 2017

(54) METHOD FOR TRANSMIT DIVERSITY OF HARQ-ACK INFORMATION FEEDBACK

(71) Applicant: HUAWEI TECHNOLOGIES CO., LTD., Shenzhen (CN)

(72) Inventors: Fredrik Berggren, Kista (SE); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 14/268,457

(22) Filed: May 2, 2014

(65) Prior Publication Data

US 2014/0241311 A1 Aug. 28, 2014

Related U.S. Application Data

(63) Continuation of application No. PCT/CN2011/081854, filed on Nov. 7, 2011.

(51) Int. Cl.
*H04L 5/00* (2006.01)
*H04L 1/16* (2006.01)
(Continued)

(52) U.S. Cl.
CPC .......... *H04L 5/0005* (2013.01); *H04L 1/1614* (2013.01); *H04L 1/1812* (2013.01);
(Continued)

(58) Field of Classification Search
None
See application file for complete search history.

(56) References Cited

U.S. PATENT DOCUMENTS

| | | | |
|---|---|---|---|
| 2007/0153928 A1* | 7/2007 | Liu | H04L 1/1671 375/260 |
| 2009/0201825 A1* | 8/2009 | Shen | H04L 1/0026 370/252 |

(Continued)

FOREIGN PATENT DOCUMENTS

| | | |
|---|---|---|
| CN | 101127584 | 2/2008 |
| CN | 102014510 | 4/2011 |

(Continued)

OTHER PUBLICATIONS

LG Electronics, Transmit Diversity for PUCCH format 1b with channel selection, Aug. 22-26, 2011 3GPP TSG RAN WG1 #66 pp. 1-10.*

(Continued)

*Primary Examiner* — Hassan Phillips
*Assistant Examiner* — Ayanah George
(74) *Attorney, Agent, or Firm* — Staas & Halsey LLP

(57) ABSTRACT

The present invention relates to a method for transmit diversity of HARQ-ACK information feedback in a wireless communication system, said system being adapted to employ transmit diversity and non-transmit diversity transmissions of HARQ-ACK information feedback, said method comprising: assigning uplink control channel resources and modulation symbols to HARQ-ACK states for at least two antenna ports such that said HARQ-ACK states are abled to be transmitted when associated uplink control channel resources are implicitly reserved, wherein at least one of said uplink control channel resources is assigned to more than one of said at least two antenna ports, and wherein uplink control channel resources and modulation symbols assigned to HARQ-ACK states for one of said at least two antenna ports is the same as when non-transmit diversity of HARQ-ACK information feedback is employed; and transmitting HARQ-ACK states assigned according to said assignment step on said at least two antenna ports.

14 Claims, 1 Drawing Sheet

(51) Int. Cl.
*H04L 1/18* (2006.01)
*H04L 1/06* (2006.01)
*H04B 7/0404* (2017.01)

(52) U.S. Cl.
CPC .......... *H04L 1/1861* (2013.01); *H04L 5/0055* (2013.01); *H04B 7/0404* (2013.01); *H04L 1/06* (2013.01); *H04L 5/001* (2013.01); *H04L 5/0026* (2013.01); *H04L 5/0051* (2013.01)

(56) References Cited

U.S. PATENT DOCUMENTS

| | | | | |
|---|---|---|---|---|
| 2010/0195575 | A1* | 8/2010 | Papasakellariou | H04W 36/385 370/328 |
| 2010/0272048 | A1* | 10/2010 | Pan | H04L 1/1635 370/329 |
| 2011/0034175 | A1* | 2/2011 | Fong | H04B 7/024 455/450 |
| 2011/0090825 | A1* | 4/2011 | Papasakellariou | H04L 1/06 370/280 |
| 2011/0122846 | A1* | 5/2011 | Yu | H03M 13/2903 370/335 |
| 2011/0243066 | A1* | 10/2011 | Nayeb Nazar | H04L 1/007 370/328 |
| 2013/0077541 | A1 | 3/2013 | Lin et al. | |
| 2013/0128826 | A1 | 5/2013 | Lin et al. | |
| 2013/0170462 | A1* | 7/2013 | Seo | H04L 5/0053 370/329 |

FOREIGN PATENT DOCUMENTS

| | | |
|---|---|---|
| CN | 102083211 | 6/2011 |
| WO | WO 2010/039561 | 4/2010 |
| WO | 2011/066721 | 6/2011 |
| WO | WO 2011/066812 | 6/2011 |

OTHER PUBLICATIONS

LG Electronics, Transmit Diversity for PUCCH format 1b with Channel Selection Aug. 22-26, 2011 pp. 1-17.*
Extended European Search Report issued on Jun. 27, 2014 in corresponding European Patent Application No. 11 875 459.7.
Research in Motion et al: "Further Evaluation on Transmit Diversity for Channel Selection (R1-113539)", 3GPP Draft, vol. RAN WG1, No. #66bis, Oct. 14, 2011 (Oct. 14, 2011), XP05038661, Mobile Compentence Centre; 650, Route Des Lucioles; F-06921 Sophia-Antipolis Cedex; France.
Alcatel-Lucent et al: "Transmit Diversity for PUCCH Format 1b with Channel Selection (R1-112407)", 3GPP DRAFT, vol. RAN WG1, No. #66, Aug. 16, 2011 (Aug. 16, 2011), XP050537526, Mobile Compentence Centre; 650, Route Des Lucioles; F-06921 Sophia-Antipolis Cedex; France.
Huawei: "Description of Modified SORTD (R1-105087)", 3GPP Draft, vol. RAN WG1, No. #62, Aug. 27, 2010 (Aug. 27, 2010) XP050450302, Mobile Competence Centre; 650, Route Des Lucioles; F-06921 Sophia Antipolis Cedex; France.
LG Electronics: "Transmit Diversity Schemes on Channel Selection for Rel-11 (R1-113183)", 3GPP Draft, vol. RAN WG1, No. #66 bis, Oct. 4, 2011 (Oct. 4, 2011), XP050538308, Mobile Competence Centre; 650, Route Des Lucioles, F-06921 Sophia Antipolis Cedex; France.
LG Electronics: "Transmit Diversity for PUCCH format 1b with Channel Selection (R1-112472)", 3GPP Draft, vol. RAN WG1, No. #66, Aug. 22, 2011 (Aug. 22, 2011), Mobile Competence Centre; 650, Route Des Lucioles, F-06921 Sophia Antipolis Cedex; France.
International Search Report issued on Aug. 23, 2012 in corresponding International Patent Application No. PCT/2011/081854.
"3$^{rd}$ Generation Partnership Project; Technical Specification Group Radio Access Network; Evolved Universal Terrestrial Radio Access (E-UTRA); Physical Channels and Modulation (Release 10)", *3GPP TS 36.211 V10.3.0 (Sep. 2011) Technical Specification*, 2011, pp. 1-103, 3$^{rd}$ Generation Organization Partners.
"3$^{rd}$ Generation Partnership Project; Technical Specification Group Radio Access Network; Evolved Universal Terrestrial Radio Access (E-UTRA); Physical layer procedures (Release 10)", *3GPP TS 36.213 V10.3.0 (Sep. 2011) Technical Specification*, 2011, pp. 1-122, 3$^{rd}$ Generation Organization Partners.
International Search Report mailed Aug. 23, 2012 in corresponding International Application No. PCT/CN2011/081854.
Chinese Office Action dated Apr. 28, 2017 in corresponding Chinese Patent Application No. 201180074218.6, 6 pages.
Chinese Search Report dated Apr. 13, 2017 in corresponding Chinese Patent Application No. 201180074218.6, 3 pages.

* cited by examiner

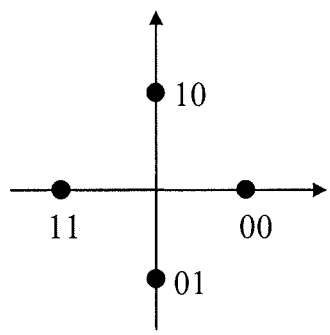

METHOD FOR TRANSMIT DIVERSITY OF HARQ-ACK INFORMATION FEEDBACK

CROSS-REFERENCE TO RELATED APPLICATIONS

This application is a continuation of International Application No. PCT/CN2011/081854, filed on Nov. 7, 2011, which is hereby incorporated by reference in its entirety.

TECHNICAL FIELD

The present invention relates to a method for transmit diversity of HARQ-ACK information feedback in a wireless communication system. Furthermore, the invention also relates to a computer program, a computer program product, a mobile station device and a base station device thereof.

BACKGROUND OF THE INVENTION

In 3GPP E-UTRA Rel-10 (LTE-Advanced), multiple component carriers can be aggregated in the uplink and downlink, respectively. For example, to provide high data rates, a User Equipment (UE) can receive simultaneous transmissions on multiple downlink component carriers. Sometimes the notion of a cell is used instead of component carrier, and aggregation could equivalently be for cells. In an aggregation case the UE may be configured with multiple serving cells. A cell may provide both an uplink and a downlink direction of communication and may thus comprise both an uplink and downlink component carrier. Hence, the definition of a cell in mentioned standard's context is not limited to a geographical location and one base station (eNodeB) may facilitate multiple serving cells. A UE can be assumed to have a Primary serving cell (PCell) as well as one or several Secondary serving cells (SCells). A person skilled in the art could equivalently use the terminology of cells instead of component carriers in relation to carrier aggregation.

At the transmitter, data is encoded, modulated and arranged in a transport block. Each component carrier is individually configured for either spatial multiplexing or no spatial multiplexing. For one UE, when spatial multiplexing is not configured, a component carrier is used for transmission of 1 transport block, when spatial multiplexing is configured, i.e. MIMO transmission, up to 2 transport blocks are transmitted on the component carriers. If the detection of a transport block is successful, the UE sends an ACK message on the uplink and if the detection is unsuccessful, a NACK message is sent. Thus, with carrier aggregation, multiple ACK or NACK messages (also referred to as HARQ-ACK bits or states) need to be transmitted from the UE in response to the transmitted transport blocks over different downlink component carriers.

Before processing the transport block for dynamically scheduled data transmissions a Physical Downlink Control Channel (PDCCH) first needs to be detected which contains the downlink assignment information needed to receive the data channel and to decode the transport block. If the UE did not correctly receive the control channel, the UE is not aware that it is expected to receive any data and it does not send any feedback; neither ACK nor NACK in the uplink. This is referred to as discontinuous transmission (DTX). DTX is thus also expected if the eNodeB did not transmit any PDCCH. Data can also be received without an associated PDCCH, i.e. semi-persistent scheduling (SPS). For SPS, resources for the data channel are assigned to the UE for longer periods.

The eNodeB knows when to expect a NACK or ACK and upon DTX detection, the eNodeB would have to initiate a re-transmission, if it had transmitted the PDCCH. One PDCCH transmission contains the assignments for both transport blocks in a MIMO transmission. If the PDCCH is missed, both assignments are lost. Hence, DTX applies to both transport blocks simultaneously for MIMO transmissions.

In addition to missing a downlink assignment, the ACK/NACK signaling in the uplink may be erroneous, e.g. a transmitted ACK may be received as a NACK, or a transmitted NACK may be received as an ACK. A NACK-to-ACK error may introduce HARQ buffer corruption due erroneous combination of several transmissions since the UE may expect a retransmission while the eNodeB schedules a new packet. An ACK-to-NACK error causes inefficient system operation due to unnecessary retransmissions which the UE is not expecting. It is therefore important to provide robust ACK/NACK signaling.

Channel selection is one method that is capable for transmission of multiple ACK and NACK bits. The method assumes that a set of channels is reserved for the UE. The HARQ-ACK information feedback transmission is performed on the selected channel by QPSK modulated sequences and the feedback information is encoded by both the selection of the channel in the form of sequence and the QPSK constellation point. This is referred to as PUCCH format 1b with channel selection.

The channel selection refers to the selection of the sequence, and several orthogonal sequences can be transmitted on the same frequency resource (for different UEs). That is, channels are obtained by Code Division Multiplexing (CDM) of sequences if they are transmitted in the same resource block. Since only one sequence is selected and transmitted for one UE, channel selection preserves the single-carrier property of the signal. For LTE Rel-10, channel selection is used in the context of conveying ACK/NACKs from multiple component carriers, or serving cells. This applies for up to 4 HARQ-ACK bits and is defined for both FDD and TDD with aggregation of up to two serving cells. To encode the ACK/NACK/DTX information, a mapping is used between the different states of ACK, NACK and DTX, and the channels and QPSK constellation points.

In LTE Rel-10 there is no transmit diversity defined for PUCCH format 1b with channel selection. However, a few transmit diversity schemes have been given in prior art. One such scheme is Spatial Orthogonal Resource Transmit Diversity (SORTD), which uses two mutually disjoint sets of channels on the different antenna ports. The same QPSK symbol is transmitted on both antenna ports. This gives good performance but the drawback of this scheme is that the number of channels that need to be reserved for a UE doubles compared to not using any transmit diversity scheme.

To mitigate this channel overhead issue, another class of schemes has been given in prior art which are referred to as Enhanced Spatial Orthogonal Resource Transmit Diversity (E-SORTD). For these schemes the same set of channels can be used on both antenna ports. Another scheme in prior art is Space-Code Block Coding (SCBC), where in addition to use the same set of channels on both antenna ports, the modulation symbols on the different antenna ports are determined by Alamouti encoding.

According to 3GPP TS36.211 (Rel-10), the PUCCH format 1b in a slot comprises 7 OFDM symbols (6 if extended cyclic prefix is configured) of which 4 OFDM symbols contain the QPSK modulated data sequence and 3 OFDM symbols (2 if extended cyclic prefix is configured) contain a demodulation reference signal sequence. The demodulation reference signal serves as a phase reference for the detection of the QPSK symbol and the data sequence. The sequences are constructed from a QPSK sequence which is further modulated with a complex exponential function (generating a cyclic shift in the time domain) and an orthogonal cover code. The resource on antenna port $\tilde{p}$ used for transmission of the PUCCH format 1b is identified by a resource $n_{PUCCH}^{(1,\tilde{p})}$. This resource is also referred to as the channel. The resource value is used in deducing the details of the sequence and the frequency resources to be used for transmitting the sequence, e.g. cyclic shifts, orthogonal cover code and assigned resource block. In LTE Rel-10, the demodulation reference sequence is related to the data sequence in a predefined manner i.e. both are deduced from the same resource value. Hence, the signal space that can be used for transmitting the HARQ-ACK information comprises the selection of the resource and the QPSK symbol. In Sec. 10.1 of 3GPP TS36.213, tables are contained mapping the information states ACK, NACK and DTX to uplink control channel resources and QPSK symbols.

In E-SORTD, the signal space is extended by relaxing the assumption on a pre-determined relation between the data and reference signal sequence. When the reference signal sequence can be selected independently, the signal space comprises the resource for the data sequence, the resource for the reference signal sequence and the QPSK symbol.

SUMMARY OF THE INVENTION

An object of the present invention is to provide a method which mitigates and/or solves the disadvantages of prior art solutions. More specifically, the invention aims to provide a method for transmit diversity of HARQ-ACK information feedback in a wireless communication system that provides good performance and low complexity.

According to an aspect of the invention, the objects are achieved with a method for transmit diversity of HARQ-ACK information feedback in a wireless communication system, said wireless communication system being adapted to employ transmit diversity and non-transmit diversity transmissions of HARQ-ACK information feedback, said method comprising the steps of:
assigning uplink control channel resources and modulation symbols to HARQ-ACK states for at least two antenna ports such that said HARQ-ACK states are abled to be transmitted when associated uplink control channel resources are implicitly reserved, wherein at least one of said uplink control channel resources is assigned to more than one of said at least two antenna ports, and wherein uplink control channel resources and modulation symbols assigned to HARQ-ACK states for one of said at least two antenna ports is the same as when non-transmit diversity of HARQ-ACK information feedback is employed; and
transmitting HARQ-ACK states assigned according to said assignment step on said at least two antenna ports.

Different embodiments of the above method are disclosed in the detailed description and defined in the appended dependent claims. The invention also concerns a computer program and a computer program product relating to the above method.

According to another aspect of the invention, the objects are also achieved with a mobile station device arranged for communicating in a wireless communication system, said mobile station device having at least two antenna ports for transmitting HARQ-ACK information feedback and being adapted to employ transmit diversity and non-transmit diversity transmissions of HARQ-ACK information feedback, further being arranged to:
transmit HARQ-ACK states on said at least two antenna ports, wherein said HARQ-ACK states are assigned according to any method above.

According to yet another aspect of the invention, the objects are also achieved with a base station device base station device arranged for communicating in a wireless communication system, said wireless communication system being adapted to employ transmit diversity and non-transmit diversity transmissions of HARQ-ACK information feedback from one or more mobile station devices, further being arranged to:
receive HARQ-ACK states from said one or more mobile station devices, wherein said HARQ-ACK states are assigned according to any method above.

The present invention provides a solution for transmit diversity of HARQ-ACK information feedback with good performance by allowing modulation symbols to be chosen as to minimize the error probability on a given channel. The invention enables efficient reservation of uplink control channel resources by means of implicit reservation. The invention further eliminates ambiguity in ACK/NACK feedback signaling during reconfiguration periods which offers the base station full freedom of scheduling during reconfiguration periods thereby improving system performance.

Further applications and advantageous of the invention will be apparent from the following detailed description.

BRIEF DESCRIPTION OF THE DRAWINGS

FIG. 1 shows a Gray coded signal constellation for QPSK modulation.

DETAILED DESCRIPTION OF THE INVENTION

The present invention relates to a method for transmit diversity of HARQ-ACK information feedback in a wireless communication system which is adapted to employ transmit diversity and non-transmit diversity transmissions of HARQ-ACK information feedback.

The present method involves assigning uplink control channel resources and modulation symbols to HARQ-ACK states for at least two antenna ports such that the HARQ-ACK states are abled to be transmitted when associated uplink control channel resources are implicitly reserved. Implicit resource reservation means that the associated PDCCH does not carry explicit information of resources, instead the resources are determined from an enumeration describing which time-frequency resources the PDCCH is transmitted on. Hence, implicit resource reservation implies that if a UE misses a PDCCH (i.e. the feedback state is DTX), it cannot reserve the associated resources. However, the other PDCCH may at the same time be correctly received and the UE is expected to feedback ACK or NACK for its associated transport block(s). At a given instant, there may thus exist HARQ-ACK feedback in the form of ACK and NACK for one component carrier and at the same time a feedback state DTX for another component carrier. This means that signaling of HARQ-ACK states that comprise a DTX, may not use a resource that should be reserved from the PDCCH that was in DTX.

Further, to minimize the resource overhead it is advantageous to reuse the uplink control channel resources on multiple antennas. Hence, at least one of the uplink control channel resources is assigned to more than one of said at least two antenna ports.

Moreover, the uplink control channel resources and modulation symbols assigned to HARQ-ACK states for one of the at least two antenna ports is the same as when non-transmit diversity of HARQ-ACK information feedback is employed. Thus, the mapping of HARQ-ACK states to the signal space for one antenna port is exactly the same mapping as when transmit diversity is not used. According to a preferred embodiment of the invention the assignment of uplink control channel resources and modulation symbols for one antenna port is exactly the same as for 3GPP E-UTRA (antenna port 0).

Finally, the present method involves the step of transmitting HARQ-ACK states assigned according to the assignment step above on the at least two antenna ports.

Generally, a UE may be configured by the network to use transmit diversity if the channel conditions are bad. Once channels conditions are good, it may be configured to not use transmit diversity. Such re-configuration between transmit diversity and non-transmit diversity, and vice versa, is signaled by Radio Resource Control (RRC) signaling. This signaling may be comparatively slow, so there may exist instants when the eNodeB does not know whether the UE has received the configuration command and whether it applies transmit diversity or not. This causes an ambiguity since the eNodeB may not know whether the HARQ-ACK mapping for transmit diversity is used or if the HARQ-ACK mapping for non-transmit diversity is used. This causes an ambiguity for the eNodeB on the representation of the signal states with regards to HARQ-ACK states. If the eNodeB cannot detect the HARQ-ACK feedback, it cannot schedule the UE during reconfiguration periods. Hence, the throughput will decrease in the system.

In the present invention, the above ambiguity problem is solved by that for the transmit diversity scheme, the mapping of HARQ-ACK states to the signal space for one antenna port is exactly the same mapping as when transmit diversity is not used. For example, in Table 1 below, the mapping of HARQ-ACK for antenna port 0 is the same as in LTE Rel-10 FDD table for HARQ-ACK bits. The channel indices in the table refer to different uplink control channel resources, e.g. index i may refer to resource $\eta_{PUCCH,i}^{(1,\tilde{p})}$. It can be seen that on antenna port 0, only the channel pairs (0,0), (1,1) and (2,2) are used, i.e. the same resource is used for the Reference Signal (RS) and data sequence. For antenna port 1, the E-SORTD principle described above is assumed since the same resource may not be used for the RS and data sequence, e.g. (2,3).

Further, according to yet another embodiment, the physical control channels in the present wireless communication system, such as 3GPP E-UTRAN, comprises resource assignment information. In one example, the implicitly reserved uplink control channel resources are derived from a time-frequency position of the physical control channels. The physical control channels are preferably PDCCH in a LTE or any equivalent system. The PDCCH is transmitted on a set of uniquely enumerated time-frequency resources referred to as Control Channel Elements (CCEs). In LTE Rel-10, the PUCCH resources $\eta_{PUCCH}^{(1,\tilde{p})}$ can be obtained by the UE by an implicit mapping from the CCE on which the associated PDCCH is transmitted, if the PDCCH is transmitted on the Primary Cell (PCell). If 1 resource is to be reserved, the first CCE number, $\eta_{PUCCH,i}^{(1,\tilde{p})}(n_{CCE,i})$, is used and if 2 resources are to be reserved, also the second CCE number is used, $\eta_{PUCCH,i+1}^{(1,\tilde{p})}(n_{CCE,i}+1)$. If there is no associated PDCCH, e.g. if data is transmitted by Semi-Persistent Scheduling (SPS), the resource indices can be explicitly configured by higher layers. Explicitly configured resources are also given if the PDCCH is transmitted on the Secondary Cell (SCell). In this case, the PDCCH contains explicit information on which subset of the set of configured resources that may be used. If the UE misses this PDCCH it also cannot reserve the explicit resources. Hence, the effect of missing a PDCCH is that some resources cannot be reserved, regardless if the PDCCH is used for implicit or explicit resource allocation. Since explicitly configured resources may become unused if the UE has no HARQ-ACK to feed back, it is generally assumed that the resource overhead is lower when implicit resource reservation is used, wherein the resource only is reserved if there is HARQ-ACK to feed back. Hence, the invention therefore also provide a transmit diversity scheme for HARQ-ACK feedback that supports implicit resource reservation, the advantageous thereof which should be clear.

It should further be realized that the present invention may be implemented in a wireless communication system employing a Frequency Division Duplex (FDD) and/or a Time Division Duplex (TDD) system. Regarding the type of modulation symbols used with the present method, these are QPSK modulation symbols according to an embodiment of the invention. Preferably, the QPSK modulation symbols comprise Gray coded bits as shown in FIG. 1.

According to yet another embodiment of the invention, the following three constraints for designing a mapping of ACK, NACK and DTX states to the signal space is applied:
1. The first constraint which is implicit resource reservation has already been mentioned. This constraint implies that if a UE misses a PDCCH (i.e. the feedback state is DTX), it cannot reserve the associated resources. This means that signaling of HARQ-ACK states that comprise a DTX, may not use a resource that should be reserved from the PDCCH that was in DTX.
2. The second constraint implies that if different uplink control channel resources are used for transmission of data sequence and reference signal sequence, it should be assured the resources are chosen such that both the data and reference signal sequences are transmitted in the same Resource Block (RB). Otherwise, the sequences will not experience the same channel fading and the channel estimated from the reference signal sequence does not correspond to the channel through which the data sequence was transmitted. It can be assumed that the resources implicitly reserved from one PDCCH will be in the same RB. Explicitly reserved resources can also be assumed to be in the same RB.
3. The third constraint is due to the fact that the transmitted signals from the different antenna ports will multiplex in the air. Hence, the receiver (e.g. the base station) cannot discriminate between the antennas ports used at the transmitter. In order to uniquely decode the HARQ-ACK states, this implies that the signal combination (sequences/channels and QPSK symbol) used for one HARQ-ACK state cannot encode another HARQ-ACK state if the antenna ports are swapped which is equivalent to swapping the enumeration for the antenna ports. This means that the assigned uplink control channel resources and modulation symbols to the different HARQ-ACK states is unique for all antenna ports at the transmitter.

Table 1 below illustrates a mapping of HARQ-ACK states ACK (A), NACK (N) and DTX (D) to a signal space for two antenna ports according to an embodiment of the invention where the above mentioned three constraints are fulfilled.

In some entries of Table 1, a joint NACK/DTX state is assumed. For such a state, the eNodeB can conclude that either the decoding failed or the PDCCH was not received and the eNodeB will initiate a retransmission. RS denotes the resource index (channel) of the reference signal sequence, Data denotes the resource index (channel) of the data sequence and QPSK denotes the bits of the QPSK symbol that modulates the data sequence. The bits are mapped according to FIG. 1. HARQ-ACK(0) and HARQ-ACK(1) are assumed to be associated with a transmission of 2 resource blocks on one component carrier and HARQ-ACK(2) is associated with a transmission of 1 resource block on another component carrier. For example, channel 0 and 1 can be implicitly reserved from a PDCCH associated with HARQ-ACK(0) and HARQ-ACK(1) (i.e. a MIMO transmission with 2 transport blocks), and channel 2 and 3 can be implicitly reserved from a PDCCH associated with HARQ-ACK(2) (i.e. a SIMO transmission with 1 transport block).

As observed, the first constraint is fulfilled since when both HARQ-ACK(0) and HARQ-ACK(1) is DTX, channel 0 or channel 1 is not used on any antenna port. Similarly, when HARQ-ACK(2) is DTX, channel 2 or channel 3 is not used on any antenna port. It can be noted that the two last rows comprise the same signal combinations. Given the above definitions, the only valid state for these two rows is thus N,N,D, hence the last two rows would not cause any ambiguity for the eNodeB. The reason for assigning the same signal combinations to the two last rows is that the state D,D,D should be precluded, since such a state cannot be signaled due to that all PDCCHs have been missed and no resource (i.e. channels 0 and 1) would be available. In the case of D,D,D, the UE will not perform any HARQ-ACK feedback transmission at all.

The second constraint is also fulfilled in Table 1 since for a given antenna port, the resource indices for the RS and data are any of the pairs: (0,0), (0,1), (1,0), (1,1), (2,2), (2,3), (3,2) or (3,3). That is, there is no combination (0,2), (2,0), (0,3), (3,0), (1,2), (2,1), (1,3) or (3,1) in Table 1. If implicit resource reservation is used, channel 0 and 1 would be reserved from the PDCCH associated with HARQ-ACK(0) and HARQ-ACK(1); and channel 2 and 3 would be reserved from the PDCCH associated with HARQ-ACK(3). Therefore, it can be assumed that the RS and data sequence will be transmitted in the same RB.

It can also be realized that the third constraint is fulfilled in Table 1. The skilled person in the art can exchange the antenna port indices in the top row and find that the signal states in such a modified table do not cause any ambiguity with the HARQ-ACK states in Table 1. That is, with the exception of the two last rows, which would not cause any ambiguity as explained previously, there will be no row in such a modified table having the same signal combinations as in Table 1.

TABLE 1

Mapping of HARQ-ACK states to the signal space for two antenna ports for LTE FDD.

| HARQ-ACK(0), HARQ-ACK(1), HARQ-ACK(2) | Antenna port 0 | | | Antenna port 1 | | |
|---|---|---|---|---|---|---|
| | RS | Data | QPSK | RS | Data | QPSK |
| A, A, A | 1 | 1 | 1, 1 | 2 | 3 | 1, 1 |
| A, N/D, A | 1 | 1 | 1, 0 | 2 | 3 | 1, 0 |
| N/D, A, A | 1 | 1 | 0, 1 | 2 | 3 | 0, 1 |
| N/D, N/D, A | 2 | 2 | 1, 1 | 3 | 3 | 1, 1 |
| A, A, N/D | 0 | 0 | 1, 1 | 1 | 1 | 1, 1 |
| A, N/D, N/D | 0 | 0 | 1, 0 | 1 | 1 | 1, 0 |

TABLE 1-continued

Mapping of HARQ-ACK states to the signal space for two antenna ports for LTE FDD.

| HARQ-ACK(0), HARQ-ACK(1), HARQ-ACK(2) | Antenna port 0 | | | Antenna port 1 | | |
|---|---|---|---|---|---|---|
| | RS | Data | QPSK | RS | Data | QPSK |
| N/D, A, N/D | 0 | 0 | 0, 1 | 1 | 1 | 0, 1 |
| N/D, N/D, N | 2 | 2 | 0, 0 | 3 | 3 | 0, 0 |
| N, N/D, D | 0 | 0 | 0, 0 | 1 | 1 | 0, 0 |
| N/D, N, D | 0 | 0 | 0, 0 | 1 | 1 | 0, 0 |

The error performance of the HARQ-ACK mapping will depend on how the ACK, NACK and DTX states are assigned to the points in the signal space. For a given channel, the error probability would be minimized by maximally separating the QPSK symbols. This is illustrated in Table 2.

Consider a case where antenna port 0 is in a deep signal fade, then the received signal is primarily due to antenna port 1. There are two states using the channels (2,3), namely A,A,A and N/D,A,A. The QPSK symbols on antenna port 1 for these two states are therefore chosen to be maximally apart, i.e. in this case 1,1 and 0,0. To get this gain, the disclosed invention according to an embodiment therefore allows that for a given HARQ-ACK state, different modulation symbols can be used on the different antenna ports. This is seen by that the state N/D,A,A is using QPSK symbol corresponding to 0,1 on antenna port 0 and 0,0 on antenna port 1. It should be noted that Table 2 also comprises all the previous embodiments of implicit resource reservation and handling of ambiguity. However, the invention may also be used when for any HARQ-ACK state the same modulation symbols are used for different antenna ports.

TABLE 2

Mapping of HARQ-ACK states to the signal space for two antenna ports for LTE FDD.

| HARQ-ACK(0), HARQ-ACK(1), HARQ-ACK(2) | Antenna port 0 | | | Antenna port 1 | | |
|---|---|---|---|---|---|---|
| | RS | Data | QPSK | RS | Data | QPSK |
| A, A, A | 1 | 1 | 1, 1 | 2 | 3 | 1, 1 |
| A, N/D, A | 1 | 1 | 1, 0 | 3 | 3 | 1, 1 |
| N/D, A, A | 1 | 1 | 0, 1 | 2 | 3 | 0, 0 |
| N/D, N/D, A | 2 | 2 | 1, 1 | 3 | 3 | 0, 1 |
| A, A, N/D | 0 | 0 | 1, 1 | 1 | 1 | 1, 1 |
| A, N/D, N/D | 0 | 0 | 1, 0 | 1 | 1 | 1, 0 |
| N/D, A, N/D | 0 | 0 | 0, 1 | 1 | 1 | 0, 1 |
| N/D, N/D, N | 2 | 2 | 0, 0 | 3 | 3 | 0, 0 |
| N, N/D, D | 0 | 0 | 0, 0 | 1 | 1 | 0, 0 |
| N/D, N, D | 0 | 0 | 0, 0 | 1 | 1 | 0, 0 |

In one embodiment of the present invention, the QPSK symbols can be maximally separated even without using different QPSK symbols on different antenna ports. In Table 1, the states N/D, N/D, A and N/D, N/D, N use channels (3,3) on antenna port 1 with maximal QPSK symbol separation (i.e. 0,0 and 1,1) while using the same modulation symbols on antenna port 0, respectively.

In the following description several more embodiments of HARQ-ACK mappings according to the present invention are presented. These embodiments comprise 3 and 4 HARQ-ACK bits where antenna port 0 is defined as in 3GPP LTE Rel-10, for TDD and FDD, respectively.

TABLE 3

Mapping of HARQ-ACK states to the signal space for two antenna ports for LTE TDD.

| HARQ-ACK(0), HARQ-ACK(1), HARQ-ACK(2) | Antenna port 0 | | | Antenna port 1 | | |
|---|---|---|---|---|---|---|
| | RS | Data | QPSK | RS | Data | QPSK |
| A, A, A | 2 | 2 | 1, 1 | 3 | 3 | 0, 0 |
| A, A, N/D | 1 | 1 | 1, 0 | 0 | 0 | 0, 1 |
| A, N/D, A | 2 | 2 | 1, 0 | 3 | 3 | 1, 0 |
| A, N/D, N/D | 0 | 0 | 1, 1 | 1 | 1 | 1, 1 |
| N/D, A, A | 2 | 2 | 0, 1 | 3 | 3 | 0, 1 |
| N/D, A, N/D | 1 | 1 | 0, 1 | 0 | 0 | 1, 0 |
| N/D, N/D, A | 2 | 2 | 0, 0 | 3 | 3 | 1, 1 |
| N, N/D, N/D | 0 | 0 | 0, 0 | 1 | 1 | 0, 0 |

TABLE 4

Mapping of HARQ-ACK states to the signal space for two antenna ports for LTE TDD.

| HARQ-ACK(0), HARQ-ACK(1), HARQ-ACK(2) | Antenna port 0 | | | Antenna port 1 | | |
|---|---|---|---|---|---|---|
| | RS | Data | QPSK | RS | Data | QPSK |
| A, A, A | 2 | 2 | 1, 1 | 0 | 1 | 1, 1 |
| A, A, N/D | 1 | 1 | 1, 0 | 0 | 0 | 1, 0 |
| A, N/D, A | 2 | 2 | 1, 0 | 1 | 0 | 1, 0 |
| A, N/D, N/D | 0 | 0 | 1, 1 | 1 | 1 | 1, 1 |
| N/D, A, A | 2 | 2 | 0, 1 | 0 | 1 | 0, 0 |
| N/D, A, N/D | 1 | 1 | 0, 1 | 0 | 0 | 0, 1 |
| N/D, N/D, A | 2 | 2 | 0, 0 | 3 | 3 | 0, 0 |
| N, N/D, N/D | 0 | 0 | 0, 0 | 1 | 1 | 0, 0 |

TABLE 5

Mapping of HARQ-ACK states to the signal space for two antenna ports for LTE FDD.

| HARQ-ACK(0), HARQ-ACK(1), HARQ-ACK(2), HARQ-ACK(3) | Antenna port 0 | | | Antenna port 1 | | |
|---|---|---|---|---|---|---|
| | RS | Data | QPSK | RS | Data | QPSK |
| A, A, A, A | 1 | 1 | 1, 1 | 2 | 3 | 1, 1 |
| A, N/D, A, A | 2 | 2 | 0, 1 | 0 | 1 | 0, 1 |
| N/D, A, A, A | 1 | 1 | 0, 1 | 3 | 2 | 0, 1 |
| N/D, N/D, A, A | 3 | 3 | 1, 1 | 2 | 2 | 0, 1 |
| A, A, A, N/D | 1 | 1 | 1, 0 | 2 | 3 | 0, 0 |
| A, N/D, A, N/D | 2 | 2 | 0, 0 | 0 | 1 | 1, 0 |
| N/D, A, A, N/D | 1 | 1 | 0, 0 | 3 | 2 | 1, 0 |
| N/D, N/D, A, N/D | 3 | 3 | 1, 0 | 2 | 2 | 1, 1 |
| A, A, N/D, A | 2 | 2 | 1, 1 | 1 | 0 | 1, 1 |
| A, N/D, N/D, A | 2 | 2 | 1, 0 | 1 | 0 | 1, 0 |
| N/D, A, N/D, A | 3 | 3 | 0, 1 | 1 | 0 | 0, 1 |
| N/D, N/D, N/D, A | 3 | 3 | 0, 0 | 2 | 2 | 0, 0 |
| A, A, N/D, N/D | 0 | 0 | 1, 1 | 1 | 1 | 1, 1 |
| A, N/D, N/D, N/D | 0 | 0 | 1, 0 | 1 | 1 | 1, 0 |
| N/D, A, N/D, N/D | 0 | 0 | 0, 1 | 1 | 1 | 0, 1 |
| N/D, N, N/D, N/D | 0 | 0 | 0, 0 | 1 | 1 | 0, 0 |
| N, N/D, N/D, N/D | 0 | 0 | 0, 0 | 1 | 1 | 0, 0 |

TABLE 6

Mapping of HARQ-ACK states to the signal space for two antenna ports for LTE FDD.

| HARQ-ACK(0), HARQ-ACK(1), HARQ-ACK(2), HARQ-ACK(3) | Antenna port 0 | | | Antenna port 1 | | |
|---|---|---|---|---|---|---|
| | RS | Data | QPSK | RS | Data | QPSK |
| A, A, A, A | 1 | 1 | 1, 1 | 2 | 3 | 1, 1 |
| A, N/D, A, A | 2 | 2 | 0, 1 | 1 | 0 | 0, 1 |
| N/D, A, A, A | 1 | 1 | 0, 1 | 2 | 3 | 0, 1 |
| N/D, N/D, A, A | 3 | 3 | 1, 1 | 2 | 2 | 1, 1 |
| A, A, A, N/D | 1 | 1 | 1, 0 | 2 | 3 | 1, 0 |
| A, N/D, A, N/D | 2 | 2 | 0, 0 | 1 | 0 | 0, 0 |
| N/D, A, A, N/D | 1 | 1 | 0, 0 | 2 | 3 | 0, 0 |
| N/D, N/D, A, N/D | 3 | 3 | 1, 0 | 2 | 2 | 1, 0 |
| A, A, N/D, A | 2 | 2 | 1, 1 | 1 | 0 | 1, 1 |
| A, N/D, N/D, A | 2 | 2 | 1, 0 | 1 | 0 | 1, 0 |
| N/D, A, N/D, A | 3 | 3 | 0, 1 | 2 | 2 | 0, 1 |
| N/D, N/D, N/D, A | 3 | 3 | 0, 0 | 2 | 2 | 0, 0 |
| A, A, N/D, N/D | 0 | 0 | 1, 1 | 1 | 1 | 1, 1 |
| A, N/D, N/D, N/D | 0 | 0 | 1, 0 | 1 | 1 | 1, 0 |
| N/D, A, N/D, N/D | 0 | 0 | 0, 1 | 1 | 1 | 0, 1 |
| N/D, N, N/D, N/D | 0 | 0 | 0, 0 | 1 | 1 | 0, 0 |
| N, N/D, N/D, N/D | 0 | 0 | 0, 0 | 1 | 1 | 0, 0 |

TABLE 7

Mapping of HARQ-ACK states to the signal space for two antenna ports for LTE FDD.

| HARQ-ACK(0), HARQ-ACK(1), HARQ-ACK(2), HARQ-ACK(3) | Antenna port 0 | | | Antenna port 1 | | |
|---|---|---|---|---|---|---|
| | RS | Data | QPSK | RS | Data | QPSK |
| A, A, A, A | 1 | 1 | 1, 1 | 2 | 3 | 1, 1 |
| A, A, A, N/D | 2 | 2 | 1, 1 | 0 | 1 | 1, 1 |
| A, A, N/D, A | 0 | 0 | 1, 0 | 3 | 2 | 1, 0 |
| A, A, N/D, N/D | 1 | 1 | 1, 0 | 0 | 0 | 1, 0 |
| A, N/D, A, A | 3 | 3 | 1, 1 | 1 | 0 | 1, 1 |
| A, N/D, A, N/D | 2 | 2 | 1, 0 | 0 | 1 | 1, 0 |
| A, N/D, N/D, A | 0 | 0 | 0, 1 | 3 | 2 | 0, 1 |
| A, N/D, N/D, N/D | 0 | 0 | 1, 1 | 1 | 1 | 1, 1 |
| N/D, A, A, A | 1 | 1 | 0, 0 | 2 | 3 | 0, 0 |
| N/D, A, A, N/D | 2 | 2 | 0, 1 | 1 | 0 | 0, 0 |
| N/D, A, N/D, A | 3 | 3 | 1, 0 | 0 | 1 | 0, 0 |
| N/D, A, N/D, N/D | 1 | 1 | 0, 1 | 0 | 0 | 0, 1 |
| N/D, N/D, A, A | 3 | 3 | 0, 1 | 2 | 2 | 0, 1 |
| N/D, N/D, A, N/D | 2 | 2 | 0, 0 | 3 | 3 | 0, 0 |
| N/D, N/D, N/D, A | 3 | 3 | 0, 0 | 2 | 2 | 1, 0 |
| N, N/D, N/D, N/D | 0 | 0 | 0, 0 | 1 | 1 | 0, 0 |
| A, A, A, A | 1 | 1 | 1, 1 | 2 | 3 | 1, 1 |

It should further be understood that the diversity scheme of the present invention is also applicable to channel selection for a wireless communication system in which carrier aggregation is not employed, i.e. with one configured serving cell only. For example, in LTE Rel-10, PUCCH format 1b with channel selection is also supported for TDD when the UE is configured with one configured serving cell only (i.e. no carrier aggregation). For TDD, transmissions in multiple downlink subframes require multiple HARQ-ACK bits (information feedback) to be fed back in a single uplink subframe. For that case, the standard supports feedback up to 4 HARQ-ACK bits using channel selection. Hence, in this invention, the diversity scheme is also applicable for HARQ-ACK bits that are associated with a single configured serving cell only.

Furthermore, as understood by the person skilled in the art, any method according to the present invention may also be implemented in a computer program, having code means, which when run in a computer causes the computer to execute the steps of the present method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, the invention also relates to a mobile station device and a base station device in which the present solution is implemented and employed.

The mobile station device (e.g. a UE) is arranged for communicating in a wireless communication system, such as an LTE system. The mobile station has at least two antenna ports for MIMO transmission which means that the mobile station is arranged for transmit diversity and non-transmit diversity transmissions of HARQ-ACK information feedback. The mobile station is further arranged to transmit HARQ-ACK states on the at least two antenna ports, wherein the HARQ-ACK states are assigned according to any embodiment of the method according to the present invention.

Further, the base station device (e.g. an eNodeB) is arranged for communicating in the wireless communication system as mentioned. The base station is further arranged to receive HARQ-ACK states from one or more mobile station devices as described above. The HARQ-ACK states are assigned according to any embodiment of the method according to the present invention.

The mobile station device and base station device have all necessary means for communicating in the wireless communication system. These means may e.g. be: processing means, memory means, coupling means, antenna means, amplification means, signal processing means, etc, which should be obvious to the skilled person in the art.

Finally, it should be understood that the present invention is not limited to the embodiments described above, but also relates to and incorporates all embodiments within the scope of the appended independent claims.

The invention claimed is:

1. A method for transmit diversity of HARQ-ACK information feedback in a wireless communication system, said wireless communication system being adapted to employ transmit diversity and non-transmit diversity transmissions of HARQ-ACK information feedback, said method comprising:
assigning uplink control channel resources and modulation symbols to HARQ-ACK states for at least two antenna ports such that said HARQ-ACK states are configured to be transmitted when associated uplink control channel resources are implicitly reserved, wherein at least one of said uplink control channel resources is assigned to more than one of said at least two antenna ports, and wherein uplink control channel resources and modulation symbols assigned to HARQ-ACK states for one of said at least two antenna ports is the same as when non-transmit diversity of HARQ-ACK information feedback is employed; and
transmitting HARQ-ACK states assigned according to said assignment on said at least two antenna ports.

2. The method according to claim 1, wherein said uplink control channel resources are used for transmission of reference signals or data signals.

3. The method according to claim 2, wherein for at least one antenna port, different uplink control channel resources are assigned to reference signals and data signals, respectively, for at least one HARQ-ACK state.

4. The method according to claim 2, wherein said reference signals and data signals are transmitted in the same resource block.

5. The method according to claim 1, wherein said modulation symbols are QPSK modulation symbols and said QPSK modulation symbols comprise Gray coded bits.

6. The method according to claim 1, wherein for at least one HARQ-ACK state different modulation symbols are used for different antenna ports.

7. The method according to claim 1, wherein for any HARQ-ACK state the same modulation symbols are used for different antenna ports.

8. The method according to claim 1, wherein said assignment of uplink control channel resources and modulation symbols for said one of said at least two antenna ports is the same as for 3GPP E-UTRA.

9. The method according to claim 1, wherein physical control channels of said wireless communication system comprises resource assignment information, and said implicitly reserved uplink control channel resources are derived from a time-frequency position of said physical control channels.

10. The method according to claim 1, wherein said assigned uplink control channel resources and modulation symbols to said HARQ-ACK states is unique for all antenna ports such that a HARQ-ACK state cannot encode another HARQ-ACK state if enumeration for said at least two antenna ports are swapped.

11. The method according to claim 1, wherein said HARQ-ACK information feedback is associated with one configured serving cell only.

12. The method according to claim 1, wherein said HARQ-ACK information feedback is associated with more than one configured serving cell.

13. A non-transitory computer readable medium having computer executable instructions thereon, the computer executable instructions being used for a method for transmit diversity of HARQ-ACK information feedback in a wireless communication system, said wireless communication system being adapted to employ transmit diversity and non-transmit diversity transmissions of HARQ-ACK information feedback,
wherein the computer executable instructions, when executed by a computer, cause the computer to perform:
assigning uplink control channel resources and modulation symbols to HARQ-ACK states for at least two antenna ports such that said HARQ-ACK states are configured to be transmitted when associated uplink control channel resources are implicitly reserved, wherein at least one of said uplink control channel resources is assigned to more than one of said at least two antenna ports, and wherein uplink control channel resources and modulation symbols assigned to HARQ-ACK states for one of said at least two antenna ports is the same as when non-transmit diversity of HARQ-ACK information feedback is employed; and
transmitting HARQ-ACK states assigned according to said assignment on said at least two antenna ports.

14. A communication device for transmit diversity of HARQ-ACK information feedback in a wireless communication system, said wireless communication system being adapted to employ transmit diversity and non-transmit diversity transmissions of HARQ-ACK information feedback, said communication device comprising a processor coupled to a memory containing instructions which configure the processor to:

assign uplink control channel resources and modulation symbols to HARQ-ACK states for at least two antenna ports such that said HARQ-ACK states are configured to be transmitted when associated uplink control channel resources are implicitly reserved, wherein at least one of said uplink control channel resources is assigned to more than one of said at least two antenna ports, and wherein uplink control channel resources and modulation symbols assigned to HARQ-ACK states for one of said at least two antenna ports is the same as when non-transmit diversity of HARQ-ACK information feedback is employed; and transmit HARQ-ACK states assigned according to said assignment on said at least two antenna ports.

* * * * *